Dec. 19, 1967

C. P. HOLT, JR 3,359,552

ANALOG TO DIGITAL CONVERTER SYSTEM

Filed May 19, 1964

2 Sheets-Sheet 1

WITNESSES

Theodore F. Wrobel

James F. Young

INVENTOR

Charles P. Holt, Jr.

BY John L. Viegraffe

ATTORNEY

Dec. 19, 1967 C. P. HOLT, JR 3,359,552

ANALOG TO DIGITAL CONVERTER SYSTEM

Filed May 19, 1964

2 Sheets-Sheet 2

United States Patent Office 3,359,552
Patented Dec. 19, 1967

3,359,552

ANALOG TO DIGITAL CONVERTOR SYSTEM

Charles P. Holt, Jr., Baltimore, Md., assignor to Westinghouse Electric Corporation, Pittsburgh, Pa., a corporation of Pennsylvania Filed May 19, 1964, Ser. No. 368,485
14 Claims. (Cl. 340—347)

ABSTRACT OF THE DISCLOSURE

An analog to digital converter system utilizes single level logic by which is meant that the steering gates are biased to count in one direction in the absence of an error signal and count in the other direction in response to an error signal. Steering gates are biased by a fixed bias to normally count downwardly but respond to a dynamic energy bias to count upwardly when the unknown analog input is less than the reference signal in the comparator. Analogous operation is the steering of the dirigible wheels of a vehicle toward the curb of a street and upon contact with the curb steering the wheels back just a little and then again steering toward the curb. The operation is accomplished in the present system by dual mode steering gates which are connected as AND gates but can operate as positive and negative OR gates to steer the counter. Steering is accomplished without the requirement of complementary voltages of prior systems.

This invention relates to improvements in analog to digital conversion systems.

A primary object of the invention is to provide a new and improved system of the kind described which will have improved accuracy, sensitivity and signal to noise ratio and will be capable of high speed operation.

Analog to digital conversion can be accomplished in various ways. The speed and accuracy of such systems varies over a wide range because in some instances speed and accuracy can be sacrificed in the interest of reducing cost. In other instances, it is essential that the system be capable of very high speed, that is, be capable of accepting and processing samples of input at a very high rate and with a very great accuracy. It is to this type of system that the present invention relates. Generally speaking, the present invention relates to the type of system in which a clock pulse generator of constant frequency is used for the purpose of measuring the rate of change of some time function, the function being sampled at the oscillator frequency rate and each analog sample being converted to binary digital representation. Several variations of this type of system are known and the particular one to which the present invention relates is one in which there is a pulse generator supplying pulses through steering gates to a counter. The present system is distinguished from previous systems in that the steering gates causes the counter to count forward in response to an error signal resulting from a comparison of the digitized analog reference voltage and the sampled input analog voltage and to count backward in the absence of an error signal. For want of any better terminology, this will be referred to herein as single level logic to distinguish it from previous systems.

The accuracy of any such system is directly dependent upon the speed and accuracy with which the pulses can be steered. The sensitivity is dependent upon the speed and accuracy with which the system can follow the rapid excursions of the input analog signals and also upon the minimum size of the increments of the analog signals which can be distinguished from one another.

Another object is to provide an improved analog to digital converter system which will be very sensitive to the very small changes in the unknown analog input signal.

Another object is to provide an improved analog to digital converter system in which the steering gates are set to steer the counter to count in one direction in the absence of an error signal and to direct the counter to count in the opposite direction in response to an error signal.

Another object is to provide a novel and improved analog to digital converter which is particularly adapted to be used with a comparator circuit which generates pulses when there is voltage inequality and no pulses when there is voltage equality.

Another object is to provide a novel and improved digitizer which can be used in an analog to digital converter, wherein instead of requiring complementary voltages from a comparator to control a forward-backward counter, two sets of logic steering gates, connected in a circuit for one polarity of logic, are provided with a fixed normal bias and are connected like AND gates for that polarity of logic, the gates on one side being adapted to operate like OR gates for that polarity but are responsive to a dynamic energy bias produced by generated error signals to operate as OR gates in the other logic polarity while the gates on the first side continue to operate in the same logic polarity, thereby changing the driving side and direction of counting of the counter.

Another object is to provide an analog to digital converter providing novel and improved logic gate counter circuitry in which the logical gates between the counter stages are provided with unequal resistive input impedances so relatively proportioned that certain of the logic gates serve as negative OR gates to cause the counter to count in one direction in response only to periodic counting pulses applied to the gates and serve as positive OR gates in conjoint response to the counting pulses and pulses representing error signals to cause the counter to count in the opposite direction.

A still further object is to provide an improved analog to digital converter in which the counter normally tends to count downwardly but counts upward only when the unknown input is less in amplitude than the reference signal.

The invention itself, however, both as to its organization and method of operation, as well as additional objects and advantages will best be understood from the following description when read in connection with the accompanying drawing, in which.

Figure 1:
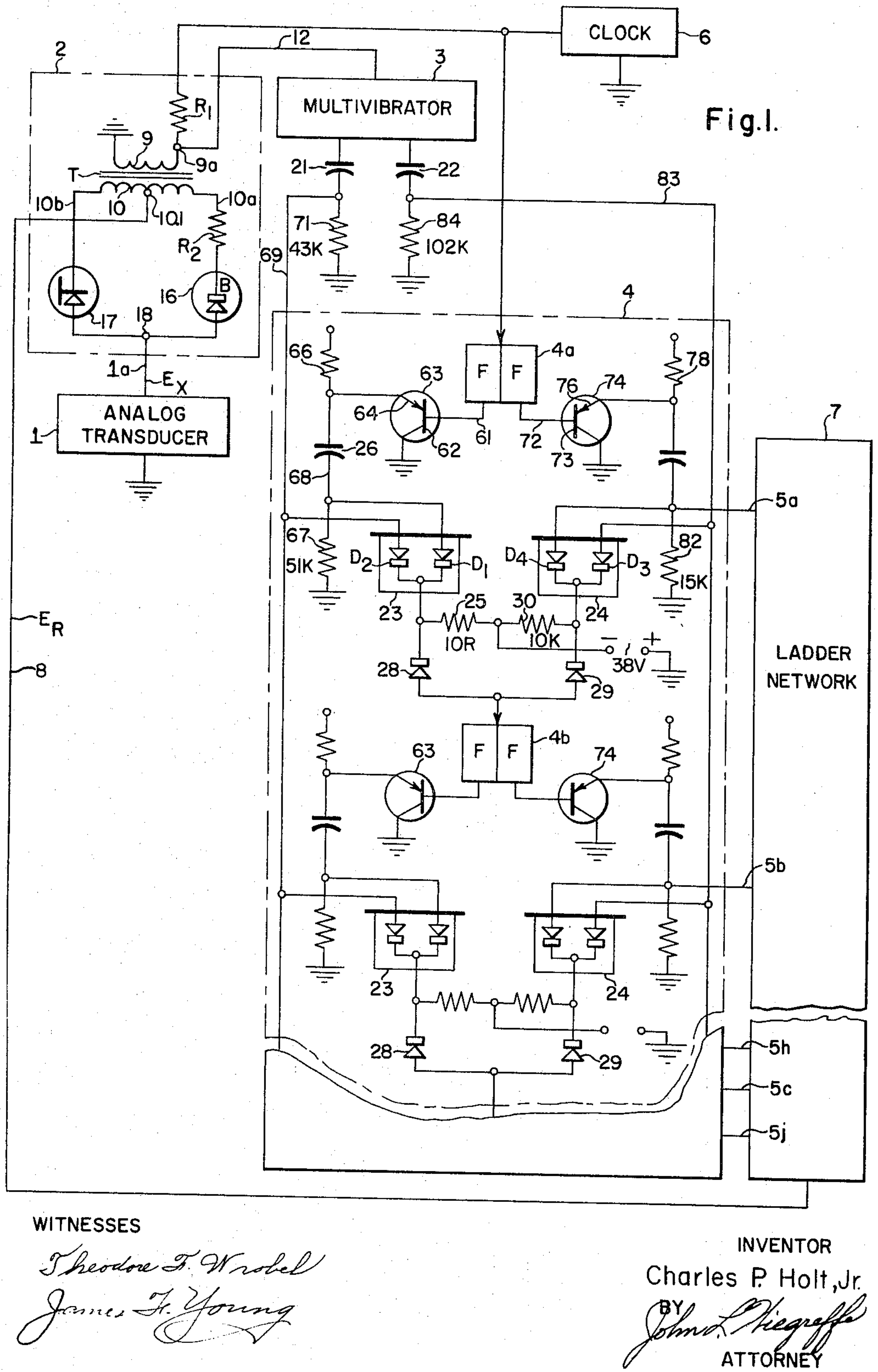
FIGURE 1 is a circuit diagram of an embodiment of the invention.

Broadly speaking, the present invention provides an analog to digital system in which a binary digital counter is cooperatively associated with a resistive ladder network ramp function generator to develop a ramp function reference voltage. The unknown input voltage is sampled by comparing it, in a suitable voltage comparator circuit, with the reference voltage. Merely for illustrative purposes, the present invention is illustrated in connection with a novel and improved simplified comparator circuit not forming a part of this invention. Instead of the comparator circuit illustrated and described it could be used with the comparator circuit described and claimed in copending application Ser. No. 267,165, for Analog to Digital Conversion System, filed Mar. 22, 1963, in the name of John M. Bentley and owned by the assignee of this application.

The present invention utilizes a single level counter logic, by which is meant that it responds to count up when there is an error signal voltage output from the comparator and counts down when there is no output from the comparator. Such a system is particularly suited to use with the particular comparator illustrated to give unusual sensitivity. Although the system is adapted to either polarity of logic the illustrated embodiment uses negative logic.

The unknown voltage $E_X$ is sampled at each clock pulse by a comparison between the unknown voltage $E_X$ and the ramp function reference voltage $E_R$ and an output voltage from the comparator, or the absence of an output voltage therefrom, directs the counter to add or subtract one bit, respectively, and thus causes the counter to servo to the unknown reference voltage by plus or minus one bit. The digital count reached on the counter then indicates the instantaneous value of the unknown input voltage $E_X$. The single level logic utilized in the present system performs the same function that normally requires complementary voltages in prior art devices and therefore, the present invention is a substantial improvement in devices heretofore known.

The novel operation is accomplished by the novel circuit configuration using one polarity of logic, in the illustrated embodiment negative logic, wherein all of the gates on one side of the counter are capable of dual mode operation while those on the other side always operate in the single mode. The dual mode gates are switched in response to a dynamic energy bias resulting from pairs of positive and negative pulses representing error signals, generated in a one-shot multivibrator, from operating as negative OR gates to operating as positive OR gates. But since the system is connected for negative logic the positive signals are ineffective in operating the gates and the negative signals applied to the gates on the other side steer the counter in the opposite direction. As the detailed description of the invention proceeds, it will be apparent that by dynamic energy bias is meant that this is a pulsing bias which is applied synchronously with the clock pulses and overrides the fixed bias on the dual mode gates to cause them to operate in one mode or the other in accordance with the forward counting of the counter in the absence of error signals and to count in the opposite direction when negative error signals are supplied to the gates on the other side of the counter which always operate as AND gates.

More specifically, this is accomplished by the novel association of the unequal input impedances of the input circuits of the dual mode gates, more fully hereinafter described. The manner in which the driving side of the counter is changed to change its direction of counting is different from previous counters in that in the present system the clock pulses are supplied continuously to the first counter stage under all conditions. Then pairs of positive and negative pulses generated by a one-shot multivibrator in response to error signals from the comparator applies a dynamic energy bias synchronously with the clock pulses to simultaneously change the operating mode of the dual mode gates from negative OR to positive OR gates while simultaneously enabling the gates on the other side of the counter. Since there are isolating diodes between the gates and the subsequnt counter stages the positive signals are ineffective and therefore the negative AND gates determine the direction of counting of the counter to cause the latter to count backward. Since the counter counts backward only in response to error signals and since the first stage of the counter operates continuously in response to signals from the clock pulse generator it is necessary that the output of the first counter stage be connected to the least significant digit of the ladder network ramp function generator which generates the digital analog reference voltage with which the unknown input signal $E_X$ is compared.

In copending application Serial No. 150,064, for Voltage Comparator Circuit, filed November 3, 1961, in the name of John M. Bentley and assigned to the assignee of this application, a comparator circuit is described and claimed in which both the unknown input voltage and the reference voltage is added to an AC signal in a circuit including two diodes connected back-to-back, the algebraic difference between the two input signals indicating the magnitude and polarity of the signal when the algebraic difference produces a current greater than the breakover current level of one of the diodes. That system is adapted to be used with analog to digital conversion systems in which the signals of different polarity from the comparator control the steering gates to cause a counter to count up or down to digitally follow the unknown input signal.

In contradistinction to that system, the present invention provides a digital counter which may be considered to be biased to count up at all times when there is no signal being received from the comparator but which reverses its counting in conjoint response to a signal from the comparator and the periodic counting pulses from the clock pulse generator. An analogy would be steering the dirigible wheels of a vehicle toward the curb of a street and upon contact with the street curb the system would steer back just a little and then again steer toward the curb to make contact therewith. Another analogy would be that of a blind man following the edge of a sidewalk with his cane. As he constantly taps to follow the edge of the sidewalk, he walks in a direction that his cane just moves off the edge of the sidewalk and then when it does he changes his direction just enough so that his cane again touches the edge of the sidewalk. The advantage of the present invention when combined with an appropriate comparator circuit, and particularly with the one illustrated herein, is that it provides a system of extreme sensitivity, accuracy and speed.

Referring to FIG. 1 of the drawing, an illustrative embodiment of the present invention comprises a system represented by the operational circuit diagram, certain circuit detail parameters being indicated where essential to an understanding of the operation of the system. The system includes a transducer 1 which supplies the unknown input signal $E_X$ to a comparator 2, the output of which is supplied to a one-shot multivibrator or switching gate 3. The multivibrator 3 is of conventional construction and is designed to have two outputs, one positive and the other negative so that pairs of signals of opposite polarity are supplied simultaneously at their outputs. In an embodiment of this invention which was reduced to practice an N-P-N transistor was used in the coupling circuit for one output and a P-N-P type transistor was used in the coupling circuit for the other output in order to develop the opposite going signal pulses. The signal pulses generated by the multivibrator 3 represent error signals, and in conjunction with the timing pulses supplied to the comparator circuit 2 and to the first binary counter stage of the counter 4 by the clock pulse generator 6, control the direction of counting of the counter 4. The comparator 2, per se, forms no part of the present invention, it merely being shown and described to illustrate the present invention. This comparator is particularly adapted to be used with the present invention because it provides the so-called "single level output," although the present invention may be used with other and conventional comparators.

The corresponding sides of each of the stages *4a* to *4j*, inclusive, of the counter 4, in the present instance the right-hand sides of the stages, are connected by connections *5a*, *5b* . . . *5j*, respectively, to a conventional ramp function generator resistive ladder network 7 to develop the binary digital analog reference voltage $E_R$ with which the unknown voltage $E_X$ is compared. The resistive ladder network 7 is of conventional design and may be connected in a conventional manner, the only significance as far as the present invention is concerned is that the output of the first counter stage 4*a* be connected to the least significant digit unit of the network 7. The reason for this will be apparent because, as previously mentioned the first counter stage 4*a* is operated continuously while the other stages of the counter are operated only in response to the gates connected to the outputs of the stage 4*a*. Accordingly, the subtraction (or addition) of one bit is always effected directly from the output of the first counter stage 4*a*. If desired, the same side of the binary stages of the counter may be connected to any suitable digital indicator (not shown) for indicating the instantaneous binary digital representation of the input analog voltage $E_X$. The output of the ladder network 7 is supplied over connection 8 to the comparator circuit 2.

In the usual analog to digital conversion systems, the forward-backward counters change direction of counting in response to the polarity of the output of the comparator 2. Such systems utilize steering gates which are operated by two separate complemental direction-determining outputs of the comparator to control the direction of counting of the counter. The present invention is distinguished from systems of that category in that the gates on the right-hand side of the counter are capable of dual mode operation while those on the left hand side always operate in a single mode. The operating mode of the right-hand gates and the enabling or disabling of the left-hand gates are effected in response to the pairs of respective positive and negative pulses simultaneously generated by the multivibrator 3 in synchronism with the positive clock pulses from the clock pulse generator 6 which are supplied directly to the first counter stage 4*a*. In a manner hereinafter more fully pointed out, although all of the gates are connected as AND gates they are provided with a normal fixed bias so that the right-hand gates will operate as negative OR gates in the absence of signals from the multivibrator 3 while the left-hand gates, always operating as AND gates, are disabled in the absence of the negative output pulses from the multivibrator 3. In other words, in the absence of signals from the multivibrator 3 the right-hand gates operate as negative OR gates in response to negative output pulses from the right-hand side of the first counter stage 4*a* while the left-hand gates are disabled by the lack of signals from the multivibrator 3, thus causing the right-hand side of the counter to be the driving side and causing the counter to count forward. The driving side of the counter is reversed when the positive output signal from the multivibrator 3, swamps the first right hand gates and disables them while the simultaneous negative output from the multivibrator 3 enables the left-hand gates and the left-hand side of the counter becomes the driving side to cause the counter to count backward. Thus, it is seen that the counter tends to count upwardly at all times, unless a pair of signals is being supplied from the multivibrator 3.

The comparator 2 comprises a transformer having a primary winding 9 energized from the clock pulse generator 6 through connection 11 and resistor R1. The output from the comparator is supplied over connection 12 to the multivibrator 3. Output signals from the comparator 2 appear on the connection 12 at all times when the input voltage $E_X$ is less than the binary digital analog reference voltage $E_R$ on connection 8 because of the normal impedance drop across the primary winding 9. The terminals of the secondary winding 10 are connected in a series circuit including a resistor R2, a backward diode 16 and a tunnel diode 17. The backward diode 16 and the tunnel diode 17 have their anodes connected to a common terminal 18 to which the connection 8 is connected. Under conditions where the voltage $E_X$ on connection 1*a* is equal to, or greater than, $E_R$ on connection 8 the center tapped secondary winding 10 will be substantially short-circuited due to the characteristics of the tunnel diode and the backward diode thus reflecting a short-circuited impedance into the primary winding 9 so that no output signal is supplied to the multivibrator 3.

The one-shot multivibrator 3 has its outputs on which the pairs of positive and negative pulses appear, connected through respective capacitors 21 and 22 to gates 23 and 24, respectively. The output circuits of the multivibrator 3 are designed so that negative pulses are supplied through the capacitor 21 and the lead 21*a* to the gate 23 and positive pulses are supplied to the capacitor 22 and the lead 22*a* to the gate 24. These gates serve to steer the counter forward or backward in accordance with the dynamic energy bias supplied from the outputs of the multivibrator 3. To this end, the outputs of the binary stage 4*a* are connected to the gates 23 and 24, respectively, through suitable capacitors 26 and 27 and suitable transistor amplifiers of conventional construction. The outputs of the gates 23 and 24 are connected through suitable isolating diodes 28 and 29 to a common input connection 31 to the second binary counter stage 4*b*. In accordance with the previous statement that the second configuration of the counter is designed for negative logic it is to be noted that the cathodes of the diodes 28 and 29 are connected, respectively, to the outputs of the gates 23 and 24. This means of course that only negative pulses can pass from either of these gates to the next counter stage 4*b*.

The outputs of the opposite sides of the second counter stage 4*b* are in turn connected to gates 34 and 36 which are identical with gates 23 and 24. Their outputs in turn are connected through further suitable isolating diodes 37 and 38, poled to pass only negative pulses as in the instance described above, to a common input connection 41 to the next stage 4*j*. It will be readily apparent that the remaining stages in the counter, of any desired number, would be connected in like manner as well understood in the art. It is to be understood of course that all of the binary stages of the counter are of the same construction and each includes desirable amplifier stages as described in connection with the first stage 4*a*.

A salient and novel feature of the present invention is the circuitry, including the fixed and dynamic energy biasing arrangement, for the gates between the counter stages which makes it possible, in response to error signals, to selectively change the mode of operation of the right-hand gates from the operating logic polarity to a mode in the opposite polarity that effectively disabled them at the same time that the left-hand gates are enabled in the normal operating logic polarity, and vice versa, to change driving sides and direction of counting of the counter. To simplify the understanding of this feature, the essential features of this part of the circuit or the first stage and the associated gates are shown in isolation in FIG. 2. These essential features are inherently described in the subsequent detailed description of the system circuitry. The coupling circuit between each of the binary counter stages and the following gates is the same for all stages and therefore the description of the essential features of FIG. 2 and the description of the coupling circuit between binary counter stage 4*a* and the two subsequent gates 23 and 24 will suffice to a complete understanding of the system.

The output of the left-hand side of the first binary counter stage 4*a* is connected by lead 61 to the base electrode 62 of a grounded collector transistor 63, the emitter 64 being connected through suitable dropping resistor 66 to a source of DC positive potential, not shown. Emitter 64 is coupled through capacitor 26 to a 51K resistor 67. The junction between the ungrounded end of the resistor 67 and the capacitor 26 is connected by lead 68 to the diode $D_1$ of the gate 23. The other diode $D_2$ of the gate 23 is coupled by lead 69 to a 43K resistor 71 which is coupled through the output capacitor 21 to one side of the one-shot multivibrator 3. The anodes of the diodes $D_1$ and $D_2$ are connected to a common terminal and through a 10K resistor 25 to a source of negative biasing potential for both of the gates 23 and 24. The right-hand side of the first binary counter stage 4*a* is connected by lead 72 to the base electrode 73 of a grounded collector transistor 74. The emitter 76 of this latter transistor is connected through a suitable dropping resistor 78 to a suitable source of positive DC potential, not shown. The emitter 76 is coupled through capacitor 27 and lead 81 to the diode $D_4$ of the gate 24. The lead 81 from the capacitor 27 is also connected to a 15K resistor 82, the lower end of which is grounded. The other diode $D_3$ of the gate 24 is connected by lead 83 to the 102K resistor 84 which is coupled through the capacitor 22 to the other output side of the one-shot multivibrator 3. The anodes of the diodes $D_3$ and $D_4$ are connected to a common terminal and through a 10K resistor 30 to the source of negative biasing potential 38 for the gates 23 and 24.

Each of the respective stages 4*a*, 4*b* . . . 4*j* are coupled to the respective following gates through the respective unequal input impedances which are related to the output circuit impedances from the one-shot multivibrator 3 in the same manner as that described for the first stage 4*a*. The exact values of these input impedances mentioned for the first binary stage 4*a* are not necessary but they should have the necessary relation, within the knowledge of one skilled in the art, to function as described. The functional effect of these unequal input impedances energized by the signals generated by the multivibrator 3 is to superimpose dynamic energy biases on the gates to change the driving sides of the binary counter while keeping the same reference side, thus providing the ability for forward-backward digital counting.

In the operation of the present invention, it must be understood that the time constant of the multivibrator 3 is somewhat less than the period of the clock pulses from the clock generator 6 so that the multivibrator 3 passes through its metastable state and returns to its original state within one cycle of the pulse generator. Any pulses from the multivibrator 3 must be in synchronous relation with the timing pulses to the first binary counter stage 4*a*. It is apparent from the circuit diagram that since the clock pulses from the generator 6 are supplied directly to the comparator 2 and to the first binary counter stage 4*a* the pulses on the output connection 12 from the multivibrator 3 occur at the same frequency at which the binary stage 4*a* is pulsed.

From the foregoing it is apparent that the left-hand diode $D_4$ of gate 24 is energized from the right-hand output of the binary stage 4*a* through an input coupling circuit including the relatively low impedance 15K resistor 82 while the diode $D_3$ is energized by the right-hand output of the multivibrator 3 through the capacitor 22 and an output coupling circuit including the relatively high input impedance 102K resistor 84. It is to be noted that both of these diodes have a fixed DC forward bias supplied through the 10K resistor 30. A further way of looking at this circuitry is that the diodes are connected in parallel in DC biasing circuits and are at the same time connected in back-to-back relation in a single series AC circuit which may be additionally energized from one output of the multivibrator 3 through the capacitor 22 and from one output of the binary stage 4*a* through the capacitor 27. In a similar manner it will be seen that the diode $D_1$ of the gate 23 is energized from the left-hand output of the binary stage 4*a* through an input coupling circuit including the 51K resistor 67 while the diode $D_2$ is energized by the left-hand output of the multivibrator 3 through the capacitor 21 and an input coupling circuit including the 43K resistor 71. It is to be noted that the input impedance of both of these circuits is of the same order of magnitude, and both are much smaller than the 102K resistor 84 but are larger than the 15K resistor 82. Here again, both of the diodes $D_1$ and $D_2$ have the same fixed DC forward bias supplied through a 10K resistor 25 from the negative source of DC potential 38. This circuitry can also be looked at as two forward biased diodes in parallel DC biasing circuits and at the same time being connected in back-to-back relation in a series AC circuit which may be additionally energized from one output of the multivibrator 3 through capacitor 21 and from the left-hand output of the binary stage 4*a* through the capacitor 26. It is this latter viewpoint that lends itself to an understanding of the simplified circuit illustrated in FIG. 2.

Again at this point is should be recalled that the isolating diodes 28 and 29 are so poled that the system normally operates to count in either direction in the negative logic polarity. Taking first the condition where there is no error signals generated by the comparator 2, and therefore there are no signals being generated in the one-shot multivibrator 3, any negative going pulse supplied from the first counter stage 4*a* through the capacitor 27 to the 15K resistor 82 will back bias the gate diode $D_4$ of the gate 24 and will cause the diode $D_3$ of the same gate, which is connected to the 102K resistor 84, to be biased further in a forward direction. However, the binary counter 4*a* is so designed that its output amplitude is such and the resistors 84 and 82 are so related to each other, having a ratio of about 7:1, that the further increase in the current drawn through the 102K resistor 84 is not enough to overcome the negative pulse developed across the 15K resistor 82 and thus the gate 24 serves as an OR gate in the normal operating negative logic and passes a negative pulse through the diode 29 into the second binary counter stage 4*b*, thereby changing the state of the latter. On the other hand, a negative going pulse appearing at the 51K resistor 67 will be effectively clamped through the gate 23 by the 43K resistor 71. In other words, the gate 23 continues to be a negative AND gate and since there is no signal supplied through the capacitor 21 from the multivibrator 3 the gate 23 remains closed and no output pulse is supplied to the second counter stage 4*b* in response to the next clock pulse from the generator 6. This analysis shows that negative pulses will pass only from the right-hand side of one binary counter stage to the input of the succeeding stage when there is not a pair of pulses, one positive and one negative appearing simultaneously to the respective capacitors 22 and 21 from the multivibrator 3. The effect of the action just described is to make the right-hand gate 24 a negative OR gate while the gate 23 continues to remain as a negative AND gate and in the absence of coincident negative pulses does not put out a negative pulse. Thus, the gate 23 is clamped at the same time that the other gate 24 is enabled without the necessity of complementary voltage pulses on the controlling gate inputs.

Now assuming that $E_X<E_R$ and therefore the one shot multivibrator 3 is pulsed by an output pulse from the comparator 2. Under the latter condition a negative pulse will be introduced at the 43K resistor 71 through the capacitor 21 and a positive pulse will be supplied through the capacitor 22 across the 102K resistor 84. The positive pulse across the 102K resistor 84 will block any negative pulses through the gate 24 since the latter which is supplied from the right-hand output of the counter stage 4*a* through the condenser 27 and thus the gate may be considered to have changed its logic and mode to that of a positive OR gate. However, in view of the fact that the diode 29 is poled for the negative logic, any positive output pulse through the gate 24 will be isolated and ineffective on the input to the second binary counter stage 4*b*. At the same time the negative pulse supplied by the multivibrator 3 across the 43K resistor 71 through capacitor 21 will be in coincidence with any negative pulse supplied across the 51K resistor 67 by the left-hand side of the first binary counter stage 4*a* through the capacitor 26. Coincidence of the negative pulses on both diodes $D_1$ and $D_2$ will "enable" the gate 23 and, since the gate 24 is disabled by the positive pulse across the resistor 84, the "driving" side of the counter 4 will be changed from the right to the left side by one signal from the voltage comparator 2.

Summarizing briefly the operation of the present invention, both sets of gates associated with the respective sides of the counter stages are connected in circuits to pass negative going pulses only. They are all normally forward biased by a fixed source of potential. Due to the difference between the values of the resistive impedances of the input circuits of the right-hand set of gates when there are no outputs from the one shot multivibrator 3 the right-hand gates operate as negative OR gates. The left-hand gates, being always negative AND gates, do not pass any negative going pulses put out by the first binary counter stage 4*a* and, accordingly, the right-hand side of the counter is the driving side and under this set of conditions the counter is designed to count forward. Then when error signals from the comparator 2 are supplied to the multivibrator 3 the latter generates pairs of pulses, one positive and the other negative. The positive pulses are supplied to the right-hand gates of the counter stages and constitute a dynamic energy bias superimposed upon the fixed bias, swamping the fixed bias on these gates and causing them to change their mode and polarity logic from negative OR gates to positive OR gates. However, since the positive pulses cannot pass the isolating diodes into the next binary counter stage they are ineffective. At the same time the negative pulses supplied by the multivibrator 3 will be in coincidence with the negative pulses supplied from the left-hand output of the binary counter stages thus enabling the left-hand set of gates so that the left-hand side of the counter becomes the driving side and the counter counts in the opposite direction. It should be understood of course, that the number of bits that the counter counts in either direction is entirely dependent upon the manner in which $E_X$ varies. Ordinarily, the counter will step forward or backward by one bit to follow the unknown input voltage.

The present digitizer described herein can be used with any comparator that gives either a single polarity or dual polarity error signal when $E_X$ does not equal $E_R$. The illustrated embodiment of the invention is arranged to utilize positive error signals from the comparator 2 when $E_X$ is less than $E_R$. However, it is within the inventive concept of the present invention to so change the circuit configuration that it could utilize error signals of negative polarity or positive polarity under conditions when $E_X$ is greater than $E_R$. For example, the present invention could be designed, by one skilled in the art and conversant with the concept of the present invention, to count down when $E_X > E_R$ and to count in the reverse direction when $E_X = E_R$ or when $E_X < E_R$. Since this device utilizes single level logic, it needs only signals of one polarity to steer the counter in a selected direction under selected conditions.

With comparators which provide signals of opposite polarities for steering digitizers that need such signals, the present digitizer would only respond to the signal of the selected polarity. The signal of undesired polarity could be isolated from the digitizer by suitable buffer amplifiers and diodes. Although not illustrated in the circuit diagram, suitable buffer and isolating amplifiers are desirable between the comparator and the digitizer to provide the desired polarity and amplitude.

Referring specifically to the cooperative relation of the comparator 2 and the digitizer of the present invention, the backward diode 16 and the tunnel diode 17 are connected in back-to-back series relation across the secondary 10 of the transformer T. As illustrated, the anodes of the two diodes are connected together to a common terminal 18 to which the output lead 1*a* from the transducer 1 is connected. The specific illustration in the drawings is not intended as limiting but merely as teaching the relation of the poling of the diodes to the poling of the winding 10 to produce the desired result.

Figures 2, 3, 4:
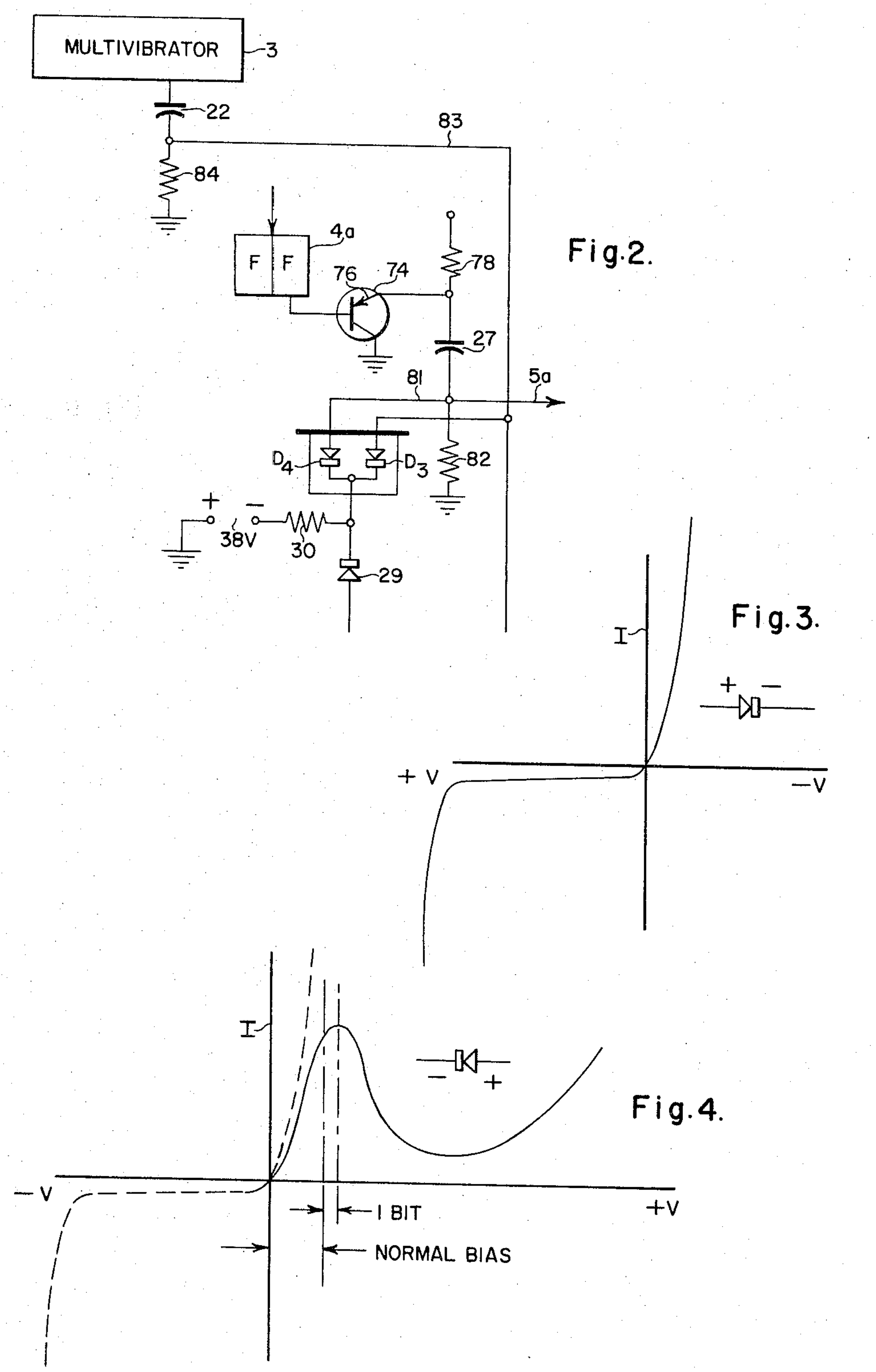
FIG. 2 is a partial circuit diagram illustrating the novel input circuits for the right hand set of gates.
FIG. 3 is a graph showing the characteristic I–V curve for a backward diode.
FIG. 4 is a graph showing the characteristic I–V curve for a tunnel diode.

In FIG. 3 is illustrated the characteristic I–V curve for the backward diode 16 and in FIG. 4 is illustrated the characteristic curve for the tunnel diode 17. It will be noted that the "easy-flow" directions for these two diodes are in opposite directions. The greater the impedance of the backward diode 16, that is, the greater its positive slope in its back-biased condition, the more sensitive will be the comparator since the most of the DC imbalance between the center tap 10.1 on the secondary transformer winding 10 and the terminal 18 is utilized to switch the tunnel diode 17.

Since the anodes of the two diodes 16 and 17 are directly connected, the easy-flow direction through the diodes are in opposite directions with respect to their respective cathode and anodes. However, since they are connected back-to-back, their easy-flow directions are in the same direction as far as the series circuit in which they are connected is concerned.

Under conditions where $E_X = E_R = O$, as a pulse from the clock generator 6 is increasing in a positive going direction at point 9*a* on the primary winding 9 it induces a voltage in the secondary winding 10 so that the lead 10*a* is positive with respect to the lead 10*b*. As previously indicated, this is the condition for easy-flow through both of the diodes 16 and 17 and the value of $R_2$ has been so chosen that, effectively, short-circuit conditions exist in the secondary winding circuit for this polarity. This low short-circuit impedance in the secondary winding is reflected into the primary winding 9 and therefore no pulse is delivered over the connection 12 to the one-shot multivibrator 3. Here it should be pointed out that in ordinary practice a suitable isolating buffer amplifier and clipping circuit (not shown) are incorporated between the primary winding 9 and the multivibrator 3 so that any small increase in the potential at terminal 9*a* resulting from a clock pulse would be clipped off as noise and would be ineffective on the multivibrator 3.

Now assume that $E_X > E_R$, that is, the terminal 18 is more positive than the center tap 10.1 on the secondary winding 10. The tunnel diode normally has a fixed bias thereon which is just below the firing point as illustrated in FIG. 4 so that a single pulse representing one bit of information will cause the tunnel to fire. It must be recalled that the clock pulses from the clock generator 6 are continuously supplied to the primary winding 9 so that a pulse which makes the lead 10*b* negative with respect to the DC bias voltage causes the tunnel diode 17 to fire, the effect of which, is to open the series circuit through the secondary winding 10 or, as least, increase its impedance very greatly. This greatly increased impedance in the secondary winding 10 is reflected into the primary winding 9 and the increased impedance drop across the latter winding causes a signal pulse to be supplied over the connection 12 to the one-shot multivibrator 3. Under these conditions the counter 4 counts backward as previously described under conditions where a positive pulse was supplied to the multivibrator 3. From what has previously been said, it will be apparent that the same pulse which fired the tunnel diode 17 created a back bias on the backward diode 16 so that it did not conduct.

Under conditions where $E_X < E_R$, that is, where the potential on the center tap 10.1 on winding 10 is slightly positive with respect to terminal point 18, the anode of the backward diode 16 will be positive with respect to its cathode, causing it to conduct and since the AC voltage in the secondary winding 10 opposes the normal DC bias the tunnel diode 17 stays in its first positive region of its characteristic curve and constitutes a very low impedance. The low impedance of the series circuit of the secondary winding 10 is reflected into the primary winding 9 of the transformer T so that no pulse is delivered over the connection 12 to the one-shot multivibrator 3. The conditions of operation of the counter 4 for zero input to the one-shot multivibrator 3 have been previously described. This is the condition under which the counter 4 counts forward.

From the foregoing, it will be readily apparent that the present invention provides a digitizer for use in an analog to digital system, as well as an analog to digital converter, in which single level logic is employed wherein the steering gates are provided with a fixed bias causing the counter to count in a selected direction in the absence of input signals from a comparator. A dynamic energy bias superimposed upon the fixed bias on the steering gates on one side at the time that enabling pulses are supplied to the gates on the other side causes the counter to count in the opposite direction in response to input signals from the comparator. The digitizer of the present invention is particularly adapted to be used with a voltage comparator circuit that generates pulses when there is a voltage inequality and no pulse when there is equality. The cooperative association of the unequal input circuit impedances of the one set of gates between the counter stages to accomplish the change of direction of counting of the counter makes this single level logic effective to perform the same function that normally requires complementary voltages to make counters count up or down in response to variations in the input unknown analog voltage $E_X$.

It will be readily obvious that the present invention is not limited to the exact details of the embodiment used for illustrative purposes. Those skilled in the art can make obvious changes without departing from the spirit of the invention.

I claim as my invention:

1. An analog-to-digital converter comprising comparator means, monostable multivibrator means having its input connected to said comparator and adapted to be triggered by signals therefrom, a counter having a plurality of bistable multivibrator counter stages, means for supplying synchronously clock pulses to said comparator and to the first of said stages of said counter, logic steering gates operably connected to the outputs of said stages and to said monostable multivibrator means, said gates being responsive to signals only from said counter stages to cause said counter to count in one direction and responsive to simultaneous signals from said monostable multivibrator means and said counter stages to count in the opposite direction.

2. In combination in an analog-to-digital converter system, a source of clock pulses, a counter having a plurality of binary counter stages responsive to clock pulses to count up or down, dual mode logic steering gates operably connected between said stages and normally biased to establish a selected driving side of said counter to cause the latttr to count in a selected direction in response to clock pulses only, means responsive to pulses from said source for sampling an unknown analog input, means for generating error signal pulses substantially synchronously with pulses supplied to said counter from said source and means for simultaneously supplying said pulses representing error signals and pulses from said source to said gates to change the mode of operation and thereby change the driving side of said counter to reverse the direction of counting of the latter.

3. A digitizer comprising monostable multivibrator means adapted to be triggered from a first state to a second state in response to an error signal pulse and to return to said first state after a selected time interval, a counter having a plurality of bistable multivibrator counter stages responsive to applied clock pulses for continuously counting up and down, dual mode logical steering gates operably associated between said stages and connected to the outputs of said bistable stages and said monostable multivibrator means, said steering gates being responsive to simultaneous signals from said multivibrator means and said bistable multivibrators to cause said counter to count in a selected direction and to count in the opposite direction in the absence of output signals from said monostable multivibrator means.

4. A digitizer comprising a counter having a plurality of counter stages responsive to applied clock pulses to count up or down, logic steering gates operably connected between said stages, means for normally biasing said gates to cause said counter to count in one direction in response to clock pulses only, and means responsive to the conjoint action of said clock pulses and pulses representing an error signal for simultaneously altering the bias on said gates to cause said counter to count in the opposite direction.

5. A digitizer comprising a source of periodic clock pulses, a counter having a plurality of bistable counter stages responsive to said counting pulses, dual mode logic steering gates operably connected between said stages, means normally biasing said gates to cause said counter to count in one direction in response to clock pulses only, and means responsive to the combined action of said clock pulses and pulses representing an error signal for periodically and synchronously altering the bias on said gates to cause said counter to count in the opposite direction.

6. In an analog-to-digital converter system, in combination a source of clock pulses, a counter having a plurality of binary counter stages responsive to applied clock pulses to count up and down, dual mode logic steering gates connected between said binary stages, means normally biasing said gates to establish a selected driving side of said counter to cause said counter to count in a selected direction in response to clock pulses only, and means for periodically and synchronously changing the bias on said gates to change the driving side of said counter to cause the latter to count in the opposite direction.

7. In an analog-to-digital system, a digitizer comprising a source of clock pulses, a binary counter having a plurality of binary stages responsive to applied clock pulses to count up and down, dual mode logic steering gates connected between said binary stages, means operably interposed between said source and said gates for generating pulses representing an error signal for periodically and synchronously changing simultaneously the bias on said gates to change the driving side of said counter to cause the latter to count in one direction in response only to clock pulses and to count in the opposite direction in response to the conjoint action of clock pulses supplied to said counter and to said pulses representing an error signal.

8. In an analog-to-digital system, in combination a source of clock pulses, a counter having a plurality of binary digital counter stages responsive to clock pulses supplied to the first of said stages to cause the counter to count up and down, dual mode logic steering gates operably connected between said binary stages, means normally biasing said gates to establish a selected driving side of said counter to cause said counter to count in a selected direction in response to clock pulses only supplied to the first of said binary stages, means operably interposed between said source and said gates for generating pulses representing an error signal which when supplied to said gates periodically and synchronously with the clock pulses supplied to said first stage causes a simultaneous change in the bias on said gates to switch their respective modes of operation to cause said counter to count in the opposite direction.

9. An analog-to-digital system comprising a source of clock pulses, a counter having a plurality of binary stages responsive to said clock pulses to count continuously up and down, dual mode logic steering gates operatively connected between said binary stages and normally biased to establish a selected driving side of said counter to cause the latter to count in a selected direction in response to counting pulses only, means responsive to pulses from said source for sampling an unknown analog input and for generating error signal pulses substantially synchronously with pulses supplied to said counter from said source, means for applying said error signal pulses to said gates synchronously with the pulses from said source to simultaneously change the bias on said gates and change their mode of operation and the driving side of said counter, thereby causing the latter to count in the opposite direction.

10. In combination in an analog-to-digital system, a source of clock pulses, a counter having a plurality of binary stages responsive to clock pulses to count up and down, dual mode logic-steering gates operably connected between said stages and normally biased to establish a selected driving side for said counter to cause the latter to count in a selected direction in response to clock pulses only, means responsive to pulses from said source for sampling an unknown analog input and for generating error signal pulses substantially synchronously with pulses supplied to said counter from said source, and means for simultaneously supplying said pulses representing error signals and pulses from said source of clock pulses to said gates to change their mode of operation and thereby change the driving side and reverse the direction of counting of said counter.

11. An analog-to-digital converter comprising a comparator having a pair of outputs, monostable multivibrator means adapted to be triggered from a first state to a second state in response to triggering pulses from said comparator and to return to said first state after a selected time interval, a counter having a plurality of bistable multivibrator counter stages, dual mode logic steering gates operably associated between said stages and connected to the outputs of the respective counter stages and said monostable multivibrator means, means for supplying clock pulses simultaneously to said comparator and to the first of said counter stages and means for normally biasing said gates to cause said counter to count in a selected direction in response to clock pulses applied to said first counter stage when no pulses are supplied from said monostable multivibrator means and to count in the opposite direction when clock pulses are simultaneously supplied from said comparator to said monostable multivibrator means and to said first stage of said counter.

12. An analog-to-digital converter comprising a comparator for comparing an unknown input analog and a generated binary digital analog reference voltage, said comparator having a pair of outputs, monostable multivibrator means adapted to be triggered from a first state to a second state in response to an error signal from said comparator and to return to said first state after a selected time interval, a counter having a plurality of bistable multivibrator counter stages, digital-to-analog electrical summation network means coupled to the corresponding sides of each of the respective stages of said counter to constitute the reference side of said counter and to provide an analog representation of the binary digits in said counter, means for supplying the binary digital reference analog voltage output from said summation network to said comparator, means for supplying the error signal output from said comparator to said monostable multivibrator means, dual mode logic steering gates operably associated between said stages and connected to the outputs of said bistable multivibrator stages and to said monostable multivibrator means, means for supplying clock pulses synchronously to said comparator circuit and to the first of said counter stages, and means for normally biasing said gates to operate in a selected mode and logic polarity to cause said counter to count in one direction in response to clock pulses only supplied to the first of said counter stages, the error signal output from said comparator providing dynamic energy bias to said gates to switch the mode and logic polarity of said dual mode gates to cause said counter to count in the reverse direction in response to the conjoint action of synchronous output pulses from said counter stages and from said monostable multivibrator means.

13. The combination as set forth in claim 12 in which said biasing means for said gates includes a plurality of resistive impedances having particular values so related to each other as to cause all the gates on one side of the counter to operate in one mode and logic polarity when clock pulses only are supplied to said first counter stage while the gates on the opposite side operate in the opposite mode and logic polarity, the modes of operation being reversed when signals are synchronously supplied to said gates from said monostable multivibrator means and from said source of clock pulses.

14. An analog-to-digital converter comprising a comparator for comparing an unknown input analog voltage with a generated binary digital analog reference voltage, a counter having a plurality of counter stages each having complemental outputs; two sets of logic steering gates operably associated between said counter stages, a first of said sets of gates being connected respectively to the corresponding outputs of said stages and a second set of gates connected to the other corresponding outputs; monostable multivibrator means having two outputs and adapted to generate simultaneously pairs of output pulses, one positive and one negative; digital to analog electrical summation network means coupled to the corresponding sides of each of said respective stages which are connected to said first set of gates to provide an analog representation of the binary digits in said counter and constituting the reference voltage, means for supplying the binary digital reference analog voltage to said comparator, means for supplying error signals from said comparator to said monostable multivibrator means, means connecting the positive outputs of said monostable multivibrator means to said first set of gates and means for connecting the negative outputs of said multivibrator means to said second set of gates, means for supplying clock pulses synchronously to said comparator circuit and the first of said counter stages, means for providing a fixed bias to said gates for operating them in a selected mode and logic polarity, said first set of gates having input impedance circuits including resistive impedances having particular values so related to each other as to cause all gates of said first set to operate as negative OR gates while the second set of gates operate as negative AND gates when no output signals are supplied by said monostable multivibrator means to said gates, said first set of gates being responsive to dynamic energy bias supplied to the input circuit to said first set of gates by the output pulses from said monostable multivibrator means to switch the mode and logic polarity of said first set of gates whereby the sides of said counter stages connected to said second set of gates becomes the driving side of said counter to reverse the direction of the count.

References Cited

UNITED STATES PATENTS

| | | | |
|---|---|---|---|
| 2,715,678 | 8/1955 | Barney | 340—347 |
| 3,017,093 | 1/1962 | Rowley | 235—155 |

DARYL W. COOK, *Acting Primary Examiner.*

MAYNARD R. WILBUR, *Examiner.*

W. J. KOPACZ, *Assistant Examiner.*